(12) United States Patent
Xu et al.

(10) Patent No.: US 12,277,168 B2
(45) Date of Patent: Apr. 15, 2025

(54) METHOD AND APPARATUS FOR IMAGE PROCESSING AND IMAGE CLASSIFICATION

(71) Applicant: Alibaba Group Holding Limited, Grand Cayman (KY)

(72) Inventors: Liangpeng Xu, Hangzhou (CN); Chuan Dai, Hangzhou (CN); Mingqian Tang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 942 days.

(21) Appl. No.: 17/114,818

(22) Filed: Dec. 8, 2020

(65) Prior Publication Data

US 2021/0201090 A1   Jul. 1, 2021

(30) Foreign Application Priority Data

Dec. 30, 2019 (CN) .......................... 201911395444.9

(51) Int. Cl.
| | |
|---|---|
| *G06F 16/55* | (2019.01) |
| *G06F 16/51* | (2019.01) |
| *G06F 16/532* | (2019.01) |
| *G06F 16/56* | (2019.01) |
| *G06F 18/21* | (2023.01) |
| *G06F 18/2415* | (2023.01) |

(Continued)

(52) U.S. Cl.
CPC .............. *G06F 16/55* (2019.01); *G06F 16/51* (2019.01); *G06F 16/532* (2019.01); *G06F 16/56* (2019.01); *G06F 18/217* (2023.01); *G06F 18/2415* (2023.01); *G06N 7/01* (2023.01); *G06N 20/00* (2019.01)

(58) Field of Classification Search
CPC ........ G06F 16/55; G06F 16/51; G06F 16/532; G06F 16/56; G06F 18/217; G06F 18/2415; G06F 18/254; G06F 16/75; G06N 7/01; G06N 20/00; G06N 3/08; G06N 5/04

See application file for complete search history.

(56) References Cited

U.S. PATENT DOCUMENTS

| | | |
|---|---|---|
| 8,189,685 B1 | 5/2012 | Choudhry et al. |
| 8,364,673 B2 | 1/2013 | Chang et al. |
| 8,370,869 B2 | 2/2013 | Paek et al. |

(Continued)

FOREIGN PATENT DOCUMENTS

| | | |
|---|---|---|
| CN | 109284894 A | 1/2019 |
| CN | 109446369 A | 3/2019 |

(Continued)

*Primary Examiner* — Ping Y Hsieh
*Assistant Examiner* — Vasali Rao Koppolu
(74) *Attorney, Agent, or Firm* — James J. DeCarlo; Greenberg Traurig, LLP

(57) ABSTRACT

The present disclosure provides methods and apparatuses for image processing and image classification. In one embodiment, the method for image processing comprises: receiving an image; obtaining a first classification result for the image based on a classification model; processing the image for classification based on a preset process, and providing a processing result into a re-ranking model to obtain a second classification result for the image; and determining a target classification result for the image, based on the first classification result and the second classification result.

20 Claims, 12 Drawing Sheets

(51) Int. Cl.
*G06N 7/01* (2023.01)
*G06N 20/00* (2019.01)

(56) References Cited

U.S. PATENT DOCUMENTS

| | | |
|---|---|---|
| 9,031,974 B2 | 5/2015 | Delgo et al. |
| 9,471,852 B1 | 10/2016 | Feris et al. |
| 9,508,011 B2 | 11/2016 | Sharon et al. |
| 9,691,361 B2 | 6/2017 | Basson et al. |
| 9,811,538 B2 | 11/2017 | Yuen |
| 9,986,290 B2 | 5/2018 | Ayers et al. |
| 10,614,311 B2 | 4/2020 | Scanlon et al. |
| 2005/0216851 A1 | 9/2005 | Hull et al. |
| 2008/0120328 A1 | 5/2008 | Delgo et al. |
| 2013/0283173 A1 | 10/2013 | Harper et al. |
| 2015/0067717 A1 | 3/2015 | Oliver |
| 2015/0161170 A1* | 6/2015 | Yee ................... G06F 16/5846 382/224 |
| 2016/0239682 A1* | 8/2016 | Kapadia .............. G06F 16/5854 |
| 2018/0121533 A1* | 5/2018 | Magnani ................ G06N 3/045 |
| 2018/0285535 A1* | 10/2018 | Zhu ..................... G06F 16/3331 |
| 2019/0180146 A1* | 6/2019 | Sacheti ................. G06F 18/214 |
| 2020/0142928 A1 | 5/2020 | Mei et al. |
| 2020/0143248 A1* | 5/2020 | Liu ..................... G06V 10/774 |
| 2021/0004589 A1* | 1/2021 | Turkelson ........ G06V 30/19173 |
| 2021/0056364 A1* | 2/2021 | Toizumi .................... G06T 7/00 |
| 2021/0150330 A1 | 5/2021 | Sharma .................... G06N 3/08 |
| 2021/0192220 A1* | 6/2021 | Qu ...................... G06V 10/764 |

FOREIGN PATENT DOCUMENTS

| | | | |
|---|---|---|---|
| CN | 110059807 A | * | 7/2019 |
| CN | 110458107 A | | 11/2019 |

\* cited by examiner

METHOD AND APPARATUS FOR IMAGE PROCESSING AND IMAGE CLASSIFICATION

CROSS-REFERENCE TO RELATED APPLICATIONS

The present application claims priority to the Chinese Patent Application No. 201911395444.9 filed on Dec. 30, 2019, which is incorporated by reference herein in its entirety.

BACKGROUND

Technical Field

The disclosure relates to the field of image classification, and in particular, to methods, apparatuses, and computing devices for image processing and image classification for video searches.

Description of Related Art

To counter video censoring systems, users tend to employ black-sample variance techniques against a reviewing system to evade supervision. Upon detecting a variant sample, a model-based image classification system needs to retrain the models and redeploy, resulting in a long update cycle and slow model updates. Therefore, there exists a need for improving the accuracy and speed of image or video classification during video reviewing.

SUMMARY

In view of this, embodiments of the disclosure provide a method for image classification. One or a plurality of embodiments of the disclosure simultaneously relate to an apparatus for image processing, an apparatus for image classification, a video search method, a video search apparatus, three computing devices, and two computer-readable storage media, so as to solve the technical defects in the art.

In one embodiment, the disclosure provides a method for image processing, the method comprising: obtaining an image; computing, based on a first machine learning model, a first classification result for the image, wherein the first machine learning model is configured for labeling the image and outputting labels and respective probabilities associated with the labels for the image; computing, based on a second machine learning model, a second classification result for the image, wherein the second machine learning model is configured for labeling the image based on vector search results of the image, outputting labels and respective probabilities associated with the labels for the image; determining a target classification result for an image for classification, based on at least the first classification result and the second classification result; and reviewing the image based on the target classification result.

In one embodiment, the disclosure provides a method for image classification, the method comprising: receiving an image; obtaining a first classification result for the image for classification based on a classification model; processing the image for classification based on a preset process; providing a processing result into a re-ranking model to obtain a second classification result for the image for classification; and determining a target classification result for the image for classification based on the first classification result and the second classification result.

In one embodiment, the disclosure provides an apparatus for image processing, the apparatus comprising: an image obtaining module configured to obtain an image; a first machine learning model processing module configured to compute, based on a first machine learning model, a first classification result for the image, wherein the first machine learning model is configured for labeling the image and outputting labels and respective probabilities associated with the labels for the image; a second machine learning model processing module configured to compute, based on a second machine learning model, a second classification result for the image, wherein the second machine learning model is configured for labeling the image based on vector search results of the image, outputting labels and respective probabilities associated with the labels for the image; a classification result obtaining module configured to determine a target classification result for the image for classification, based at least on the first classification result and the second classification result; and a review module configured to review the image based on the target classification result.

In one embodiment, the disclosure provides an apparatus for image classification, the apparatus comprising: a first classification result obtaining module configured to receive an image and obtain a first classification result for the image for classification based on a classification model; a second classification result obtaining module configured to process the image for classification based on a preset process and provide a processing result into a re-ranking model to obtain a second classification result for the image for classification; and a target classification result determination module configured to determine a target classification result for the image for classification based on the first classification result and the second classification result.

In one embodiment, the disclosure provides a computing device, the computing device comprising: a memory and a processor; wherein the memory is configured to store computer-executable instructions that, when executed by the processor, cause the computing device to perform the following: obtaining an image for processing; computing, based on a first machine learning model, a first classification result for the image, wherein the first machine learning model is configured for labeling the image and outputting labels and respective probabilities associated with the labels for the image; computing, based on a second machine learning model, a second classification result for the image, wherein the second machine learning model is configured for labeling the image based on vector search results of the image, outputting labels and respective probabilities associated with the labels for the image; determining a target classification result for an image for classification, based on at least the first classification result and the second classification result; and reviewing the image based on the target classification result.

In one embodiment, the disclosure provides a computing device, the computing device comprising: a memory and a processor; wherein the memory is configured to store computer-executable instructions that, when executed by the processor, cause the computing device to perform the following: receiving an image for classification, and obtaining a first classification result for the image for classification based on a classification model; processing the image for classification based on a preset process, and inputting a processing result into a re-ranking model to obtain a second classification result for the image for classification; determining a target classification result for the image for classification based on the first classification result and the second classification result.

In one embodiment, the disclosure provides a computer-readable storage medium for storing computer-executable instructions that, when executed by a processor, implement the steps of the methods for image processing and the methods for image classification as described in the disclosure.

In one embodiment, the disclosure provides a method for video searches, the method comprising: obtaining a plurality of videos; computing, based on a first machine learning model, first classification results for all the videos, wherein the first machine learning model is configured for labeling the videos and outputting labels and respective probabilities associated with the labels for the videos; computing, based on a second machine learning model, second classification results for all the videos, wherein the second machine learning model is configured for labeling the videos based on vector search results of the videos, outputting labels and respective probabilities associated with the labels for the videos; determining target classification results for all the videos, based at least on the first classification results and the second classification results; and obtaining user search data to determine a target video based on an association relationship between the search data and the target classification result.

In one embodiment, the disclosure provides an apparatus for video searches, the apparatus comprising: a video obtaining module configured to obtain a plurality of videos; a first video classification result determination module configured to compute, based on a first machine learning model, first classification results for all the videos, wherein the first machine learning model is configured for labeling the videos and outputting labels and respective probabilities associated with the labels for the videos; a second video classification result determination module configured to compute, based on a second machine learning model, second classification results for all the videos, wherein the second machine learning model is configured for labeling the videos based on vector search results of the videos, outputting labels and respective probabilities associated with the labels for the videos; a video target classification result determination module configured to determine target classification results for all the videos, based at least on the first classification results and the second classification results; and a target video search module configured to obtain user search data to determine a target video based on an association relationship between the search data and the target classification result.

In one embodiment, the disclosure provides a computing device, the computing device comprising: a memory and a processor; wherein the memory is configured to store computer-executable instructions that, when executed by the processor, cause the computing device to perform the following: receiving an image; obtaining a first classification result for the image for classification based on a classification model; processing the image for classification based on a preset process, and providing a processing result into a re-ranking model to obtain a second classification result for the image for classification; determining a target classification result for the image for classification based on the first classification result and the second classification result.

In one embodiment, the disclosure provides a computer-readable storage medium for storing computer instructions, when executed by a processor, implement the steps of the video search methods as described in the disclosure.

Embodiments of the disclosure provide methods and apparatuses for image processing and methods and apparatuses for classification. The method for image processing comprises: receiving an image; obtaining a first classification result for the image for classification based on a classification model; processing the image for classification based on a preset process, and providing a processing result into a re-ranking model to obtain a second classification result for the image for classification; determining a target classification result for the image for classification based on the first classification result and the second classification result. As two different results output based on different models are merged to implement the classification of the image, the accuracy of obtaining an image based on image classification is improved.

DETAILED DESCRIPTION

The disclosure is described in detail below to facilitate full understanding thereof. However, the disclosure can be implemented in many other ways different from those described herein, and those skilled in the art can make similar modifications without departing from the spirit of the disclosure. Therefore, the specification is not limited by the specific implementations disclosed below.

The terms used in one or a plurality of embodiments in the disclosure are only used for illustrative purposes of describing specific embodiments and are not intended to be limiting. The singular forms "a," "said," and "the" used in one or a plurality of embodiments of the disclosure and in the appended claims are also intended to include plural forms unless the context clearly indicates otherwise. It should also be understood that the term "and/or" used in one or a plurality of embodiments in the disclosure refers to and includes any or all possible combinations of one or a plurality of associated listed items.

It should be understood that although the terms "first, second, etc." may be used to describe various types of information in one or a plurality of embodiments in the disclosure, such information should not be limiting. These terms are only used to distinguish one type of information from another type of information. For example, without departing from the scope of one or a plurality of embodiments in the disclosure, the "first" may also be referred to as the "second," and similarly, the "second" may also be referred to as the "first." Depending on the context, the word "if" as used herein may be construed to mean "when . . . " or "upon . . . " or "in response to determining."

Figure 1:
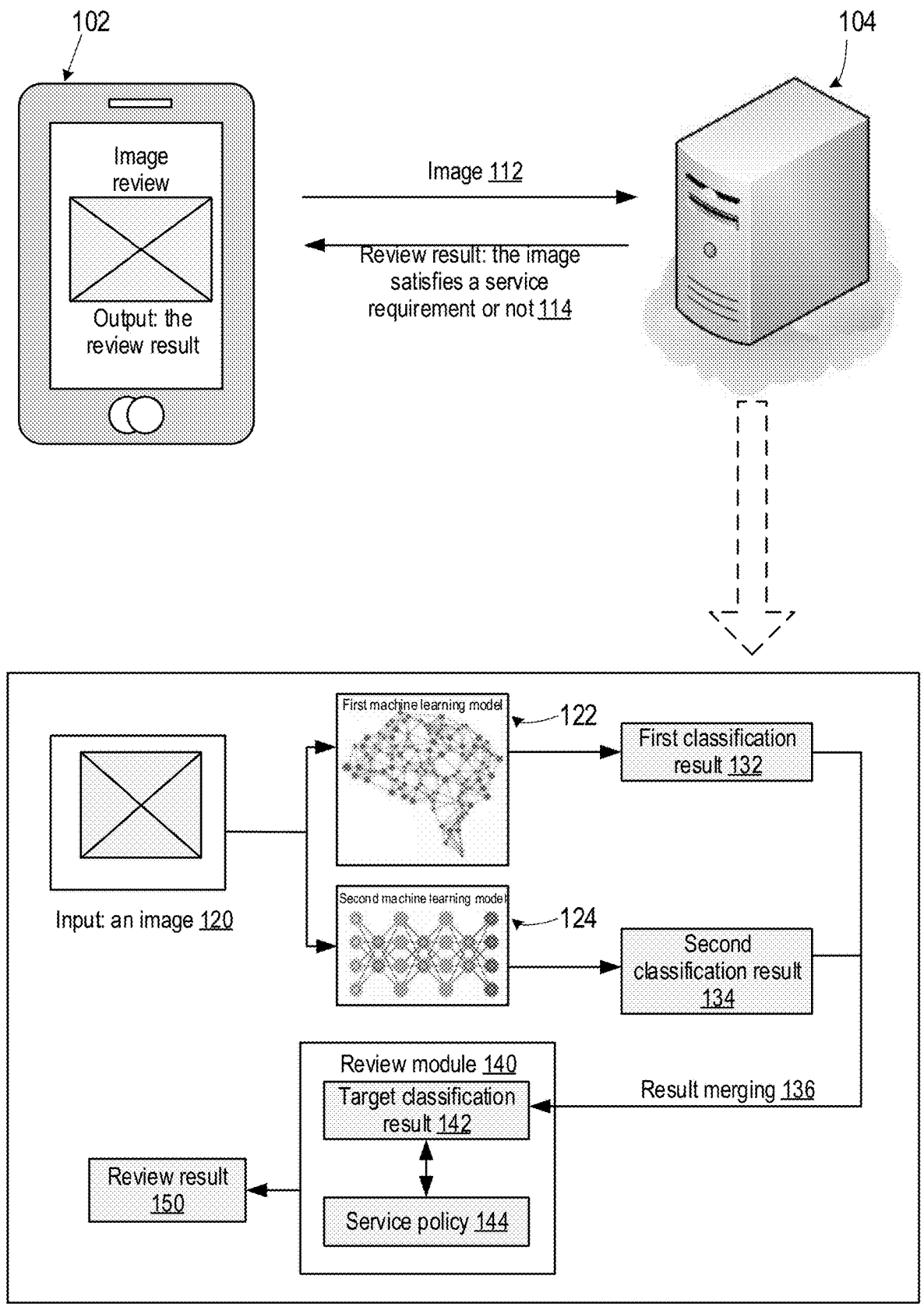
FIG. 1 is a block diagram illustrating an application scenario for image processing according to some embodiments of the disclosure.
Figure 2:
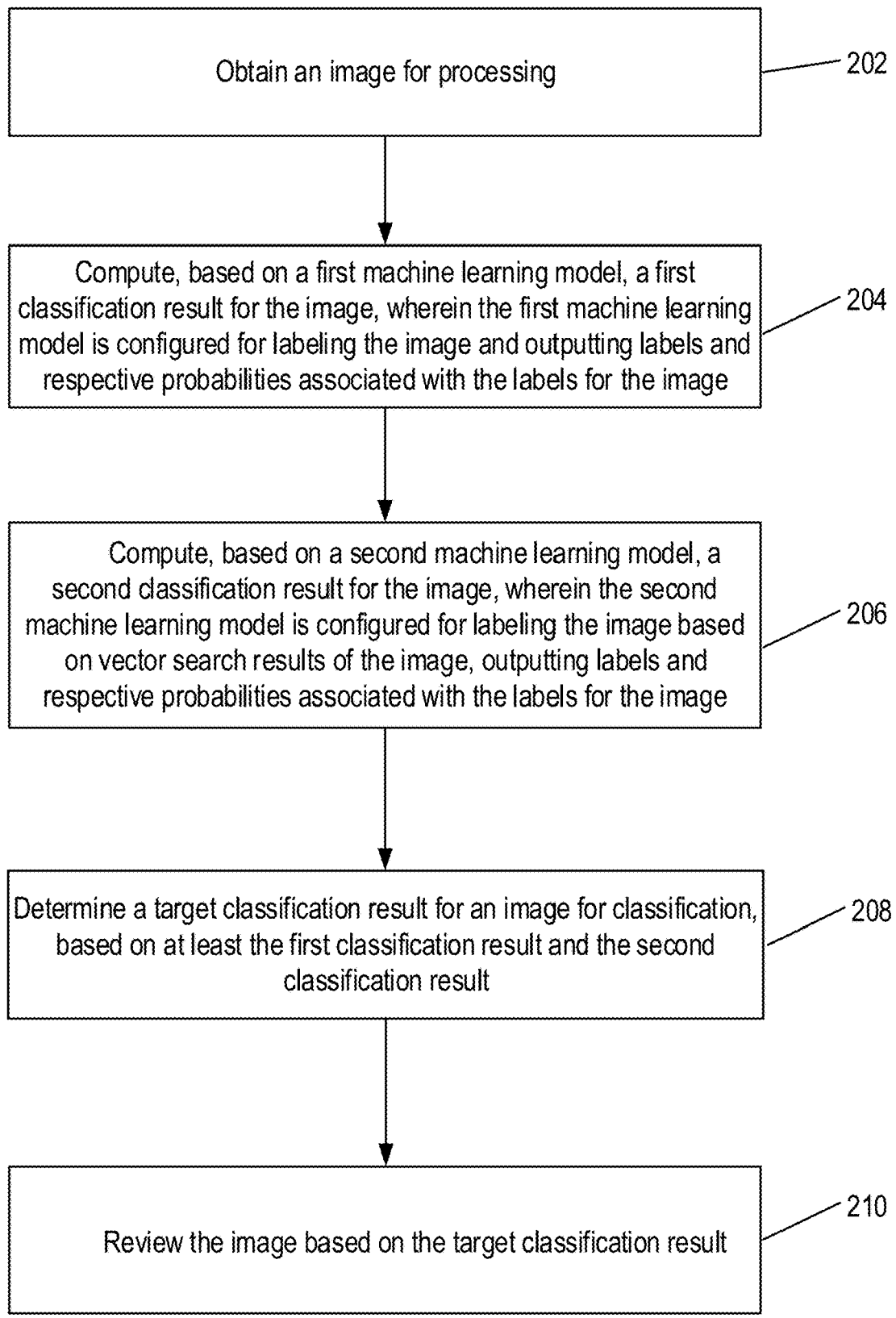
FIG. 2 is a flow diagram illustrating a method for image processing according to some embodiments of the disclosure.

FIG. 1 is a block diagram illustrating an application scenario for image processing according to some embodiments of the disclosure. FIG. 2 is a flow diagram illustrating a method for image processing according to some embodiments of the disclosure. The following illustrates the application scenario of FIG. 1 with simultaneous reference to FIG. 2.

Referring first to FIG. 1, an exemplary system configured to implement an application scenario of image processing includes a client (102) and a server (104). In the embodiment illustrated herein, a user sends an image for processing to the server (104) via the client (102). After receiving the image for processing, the server (104) computes, based on a first machine learning model, a first classification result for the image for processing; and computes, based on a second machine learning model, a second classification result for the image for processing. In turn, the server (104) determines a target classification result for the image based on the first classification result and the second classification result. Lastly, the server (104) matches the target classification result against a service policy of a service system to determine whether the image for processing satisfies a service requirement of the service system. In some embodiments, and as shown in FIG. 2, a method for processing images includes the following steps.

Step 202: obtain an image for processing.

In various embodiments, an image for classification can be a picture of any type that is obtained and requires classification. For instance, an image is a black and white picture, a color picture, a picture of people, a picture of objects, etc. In some embodiments, the image for classification can also be a video frame image obtained by segmenting a video into video frames.

Step 204: compute a first classification result for the image for processing based on a first machine learning model, wherein the first machine learning model is configured for labeling the image and outputting labels and respective probabilities associated with the labels for the image.

In some embodiments, the first machine learning model is a classification model. After the image for processing is input, the first machine learning model outputs labels corresponding to the image and respective probabilities associated with the labels.

Step 206: compute a second classification result for the image for processing based on a second machine learning model, wherein the second machine learning model is configured for labeling the image based on vector search results of the image and outputting labels and respective probabilities associated with the labels for the image.

In some embodiments, the second machine learning model is another classification model different from the first machine learning model. In some embodiments, an input of the second machine learning model is the vector search results of the image obtained via a vector index search. Based on the vector search results, the second machine learning model also outputs the labels corresponding to the image and the respective probabilities associated with the labels.

In some embodiments, the first machine learning model is trained using a training sample data set, wherein the sample data set comprises sample data and sample labels corresponding to each piece of sample data and via the following steps of classifying the training sample data set based on preset dimensions to obtain training sample data corresponding to each combination of the dimensions, wherein the training sample data corresponding to each combination of the dimensions corresponds to an initial first machine learning model; respectively training the corresponding initial first machine learning model, via the training sample data corresponding to each combination of the dimensions, to obtain the first machine learning model, wherein the first machine learning model outputs sample labels of the sample data and respective probabilities of the sample labels corresponding to the sample data.

In some embodiments, the second machine learning model is trained via the following steps of obtaining a training sample data set, wherein the sample data set comprises sample search results and sample labels of each sample search result; and training an initial second machine learning model, via the training sample data set, to obtain the second machine learning model, wherein the second machine learning model outputs sample labels of the sample data and respective probabilities of the sample labels corresponding to the sample search results.

In some embodiments, the training samples of the first machine learning model and the second machine learning model are both image samples.

Step 208: determine a target classification result for an image for classification based on at least the first classification result and the second classification result.

In some embodiments, the target classification result for the image for classification is obtained by merging the first classification result and the second classification result.

Step 210: review the image for processing based on the target classification result.

In some embodiments, the method further includes, before reviewing the image for processing based on the target classification result: obtaining a service rule policy of a service system; wherein the reviewing the image based on the target classification result comprises: determining whether the target classification result for the image for classification matches the service rule policy and if the target classification result for the image for classification does not match the service rule policy, determining that the image for classification passes the review.

In implementations, as each service has a corresponding set of service rule policies, the same image for processing may have different review results when used by different services. For example, a service rule policy of a service system 1 stipulates that a gun cannot appear in an image. If there is a gun in the image for classification, the image does not satisfy a service requirement of the service system 1. That is, the image for processing cannot pass the review in the service system 1. However, in service system 2, a service rule policy thereof does not impose a restriction on guns such that if there is a gun in the image for classification, the image still satisfy a service requirement of the service system 2, That is, the image for processing can pass the review in the service system 2.

According to various embodiments of the disclosure, with the method for image processing, after the image for processing is received, a first classification result for the image for processing is obtained based on a first machine learning model; and a second classification result for the image for processing is obtained based on a second machine learning model. Next, a target classification result for the image for processing is determined based on the first classification result and the second classification result. Lastly, the accuracy of the review result for the image for processing is determined based on the matching between the target classification result and the service rule policy.

In some embodiments, to improve the efficiency of image processing, the first machine learning model and the second machine learning model can operate in series. In one example, if the first classification result for the image for processing obtained based on the first machine learning model satisfies the review requirement of the service system, there is no need to obtain the second classification result for the image for processing based on the second machine learning model, thereby saving the processing time and improving the processing efficiency. If the first classification result for the image for processing obtained based on the first machine learning model does not satisfy the review requirement of the service system, the second classification result for the image for processing is obtained based on the second machine learning model, thereby improving the accuracy in the classification result for the image for processing, and support the service review of the service system.

Figure 3:
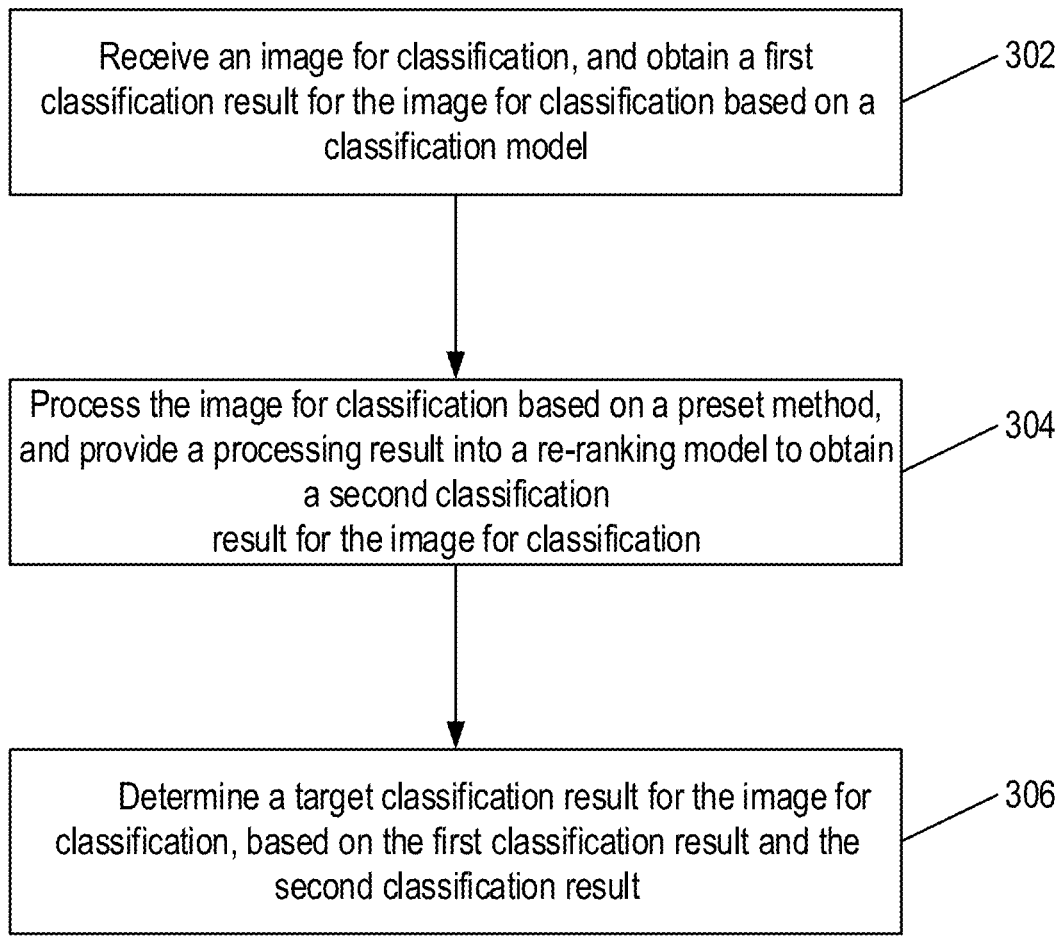
FIG. 3 is a flow diagram illustrating a method for image classification according to some embodiments of the disclosure.

FIG. 3 is a flow diagram illustrating a method for image classification according to some embodiments of the disclosure. In some embodiments and as shown herein, the method includes the following steps.

Step 302: receive an image for classification, and obtain a first classification result for the image for classification based on a classification model.

In various embodiments, an image for classification includes a picture of any type that is obtained and requires classification. For instance, an image includes a black and white picture, a color picture, a picture of people, a picture of objects, and the like. In some embodiments, the image for classification also includes a video frame image obtained by segmenting a video into video frames, details of which are illustrated in the following.

In some embodiments, receiving an image for classification includes: receiving a video for review and segmenting the video for review to obtain a sequence of video frames, wherein a video frame in the sequence of video frames represents the image for classification.

As such, the image for classification also includes each video frame in the sequence of video frames obtained by segmenting the video for review, each video frame being a video frame image.

In some embodiments, before the first classification result for the image for classification is obtained based on the classification model, sample data is collected to implement training of the classification model. In one example, the classification model is trained by the following steps: obtaining a training sample data set, wherein the sample data set comprises sample data and sample labels corresponding to each piece of sample data; classifying the training sample data set based on preset dimensions to obtain training sample data corresponding to each combination of the dimensions, wherein the training sample data corresponding to each combination of the dimensions corresponds to an initial classification model; and respectively training the corresponding initial classification model, via the training sample data corresponding to each combination of the dimensions, to obtain the classification model, wherein the classification model outputs sample labels of the sample data and respective probabilities of the sample labels corresponding to the sample data.

In some embodiments, the sample data in the training sample data set includes image sample data, and the sample labels corresponding to each piece of sample data includes image sample labels corresponding to each piece of image sample data. For example, if the content of the image sample data is the main character A holding a gun, the image sample labels are set as: the main character A+gun.

In some embodiments, in training the classification model, the collected training sample data set is first classified based on the preset dimensions, the training sample data set is divided into training sample data sets of a plurality of dimensions based on the preset dimensions. For example, if the preset dimensions are dimensions of demonstration, gun, horror, and game, the training sample data is divided into training sample data of demonstration and gun, and training sample data of horror and game based on features thereof. Each combination of the dimensions is formed by a combination of two or more dimensions, and the manner of dimension combination can be configured based on actual needs, without limitation. Further, since the training sample data corresponding to each combination of dimension corresponds to an initial classification model, in the above example, there are two initial classification models.

Next, the corresponding initial classification model is trained via the training sample data corresponding to each combination of the dimensions to obtain the classification model. Still using the above example, the corresponding initial classification model is trained by the training sample data of demonstration and gun, and the corresponding initial classification model is trained by the training sample data of horror and game to obtain two classification models.

Lastly, each classification model outputs sample labels of the sample data and the respective probabilities of the sample labels corresponding to the sample data. Still using the above example, the two classification models respectively output the sample labels of the corresponding sample data and the respective probabilities of the sample labels corresponding to the sample data. Here, the sample labels correspond to the respective probabilities of the sample data, and the sample labels represent the respective probabilities of the sample data.

In implementations, if the training data of each dimension is used to train a corresponding classification model, respectively, there are a plurality of classification models, leading to a high cost of training. However, if the training data of all the dimensions is used to train one classification model, the effect of using the classification model for subsequent image classification is poor. Therefore, in some embodiments of the disclosure, the training data of a combination of dimensions is used to train a plurality of classification models based on applications such that each classification model is trained to identify classes of a plurality of image dimensions, thereby improving the accuracy of the image classification result while achieving savings in cost.

In some embodiments, to improve the efficiency of obtaining a target classification result for the image for classification, a sample database is pre-constructed, wherein collected sample images and labels corresponding to the sample images are stored in the sample database. Details are described below.

After receiving an image for classification, the method further includes: matching the image for classification against a sample image in a sample database and determining whether there is a sample image matching the image for classification in the sample database; if there is no sample image matching the image for classification in the sample database, obtaining the first classification result for the image for classification based on the classification model, wherein the sample database stores sample images and sample labels corresponding to each sample image.

Further, after determining whether there is a sample image matching the image for classification in the sample database, the method further includes: if there is a sample image matching the image for classification in the sample database, using the sample labels corresponding to the sample image matching the image for classification as the target classification result for the image for classification.

In some embodiments, after the image for classification is received, the image for classification is first matched against a sample image in the sample database. If the image for classification matches the sample image in the sample database, the sample labels corresponding to the sample image are used as the target classification result for the image for classification. If the image for classification does not match the sample image in the sample database, the image for classification is input into the above-described trained classification model to obtain the first classification result for the image for classification.

In implementations, since a storage space occupied by a normal image is very large (e.g., a large image comprises several small images), the sample database stores an MD5 value of each sample image. As used herein, the MD5 value refers to a "fingerprint" of each image. As such, matching based on the MD5 value of each image greatly improves matching efficiency. In one embodiment, with each sample image in the sample database having an MD5 value, the matching of the image for classification against a sample image in a sample database comprises: extracting an MD5 value of the image for classification and matching the MD5 value of the image for classification with the MD5 value of the sample image in the sample database.

In some embodiments, after the image for classification is received, based on that there is a sample image matching the image for classification in the pre-constructed sample database, the target classification result for the image for classification is obtained quickly and accurately. If there is no sample image matching the image for classification in the sample database, a classification result for the image for classification is obtained based on the classification models.

Step 304: process the image for classification based on a preset process, and provide a processing result to a re-ranking model to obtain a second classification result for the image for classification.

In some embodiments, to improve the accuracy of the classification result for the image for classification, the second classification result for the image for classification is further obtained based on the re-ranking model. In one embodiment, obtaining the second classification result for the image for classification using the re-ranking model includes the following.

The processing of the image for classification based on a preset process and providing a processing result to a re-ranking model to obtain a second classification result for the image for classification includes: extracting an image feature of the image for classification based on a feature extraction model; providing the image feature into a vector index to obtain a search result of the image for classification; and providing the search result into the re-ranking model to obtain the second classification result for the image for classification.

In some embodiments, the feature extraction model is trained by the following steps of obtaining a training sample data set, wherein the sample data set comprises sample data and a sample feature corresponding to each piece of sample data; and training an initial feature extraction model via the sample data set to obtain the feature extraction model, wherein the feature extraction model outputs the sample feature corresponding to each piece of sample data.

In some embodiments, the training sample data set of the feature extraction model and the training sample data set of the classification model can be the same or different. The training sample data set of the feature extraction model includes image sample data and a sample feature of each piece of image sample data.

In some embodiments, the image feature of the image for classification is first extracted based on the feature extraction model. Next, the image feature is input into the vector index to obtain the top N number of search results of the image for classification based on the vector index. For example, the image feature is input into the vector index to obtain the ranked top N number of search results that are similar to the image for classification based on the vector index, which are input into the re-ranking model to obtain the second classification result for the image for classification.

In some embodiments, before the second classification result for the image for classification is obtained based on the re-ranking model, the re-ranking model is obtained by training based on the search results of the image for classification.

In some embodiments, a training method of the re-ranking model includes the following steps of obtaining a training sample data set, wherein the sample data set comprises sample search results and sample labels of each sample search result; and training an initial re-ranking model via the training sample data set to obtain the re-ranking model, wherein the re-ranking model outputs the sample labels of the sample data and respective probabilities of the sample labels corresponding to the sample search results.

In some embodiments, the training sample data set includes the image sample search results obtained based on the vector index and the sample labels of each image sample search results. After the initial re-ranking model is trained based on the training sample data set to obtain the re-ranking model, the re-ranking model outputs the sample labels corresponding to each image sample search result and the respective probability associated with each sample label. Here, the probability can be understood as the confidence of the sample labels corresponding to the image sample search results.

For example, with a re-ranking model, labels of 10 images that are similar to the image for classification are obtained based on the vector index. The labels and their respective degree of similarity between each image and the image for classification are input into the re-ranking model. After the labels of the ten images and the degrees of similarity between each image and the image for classification are merged, the re-ranking model outputs labels and respective probabilities associated with the labels for the image for classification.

In some embodiments, the first classification result for the image for classification is obtained based on the classification model; and the second classification result for the image for classification is obtained based on the re-ranking model. This way, the target classification result for the image for classification obtained subsequently based on the first classification result and the second classification result is more accurate.

Step 306: determine a target classification result for the image for classification based on the first classification result and the second classification result.

In some embodiments, the first classification result includes first image labels and respective probabilities associated with the first image labels, and the second classification result includes second image labels and respective probabilities associated with the second image labels. Based on the first image labels and the respective probabilities associated with the first image labels, and the second classification result including the second image label included and the respective probabilities associated with the second image labels, the target classification result for the image for classification is determined.

In some embodiments, obtaining a first classification result for the image for classification based on a classification model includes: obtaining, based on the classification model, first image labels and respective probabilities associated with the first image labels for the image for classification.

In some embodiments, inputting the search result into the re-ranking model to obtain the second classification result for the image for classification includes: inputting the search results into the re-ranking model to obtain second image labels and respective probabilities associated with the second image labels for the image for classification.

In some embodiments, determining a target classification result for the image for classification based on the first classification result and the second classification result includes: matching the first image labels against the second image labels to obtain the (matching) first image labels and the (matching) second image labels matching with each other; determining an overlapped label of the image for classification based on respective probabilities associated with the matching first image labels and respective probabilities associated with the matching second image labels; and merging the first image labels and the second image labels that do not match each other and the overlapped labels to obtain the target classification result for the image for classification.

In some embodiments, merging the first image labels and the second image labels that do not match each other and the overlapped labels to obtain the target classification result for the image for classification includes: merging the first image labels and the second image labels that do not match each other and the overlapped label via a merge model to obtain the target classification result for the image for classification.

For example, if the probability corresponding to games in the overlapped first image labels is 0.1, and the probability corresponding to games in the second image labels is 0.99, the merge model determines that there is a label corresponding to games in the image for classification.

However, in implementations, merging the first image labels and the second image labels to obtain the target classification result for the image for classification is more complicated. For example, in the first image labels, a probability associated with guns is 0.9, a probability associated with explosions is 0.95, a probability associated with bloodiness is 0.2, and a probability associated with eroticism is 0.8. After a result of the first image label is input into the merge model, the merge model determines that: since guns and explosions appear in the image, the probability that there is bloodiness I high. In this case, the merge model changes the probability associated with bloodiness to 0.5 based on the situation. Further, the merge model further determines that eroticism generally does not appear in the same image with guns, explosions, etc., although the probability associated with eroticism is 0.8. As such, the merge model determines that the probability associated with eroticism is determined incorrectly and changes the probability associated with eroticism to 0.2. Merging the first image label and the second image label that do not match each other and the overlapped label via the merge model to obtain the target classification result for the image for classification can be performed based on the merge model-based actual applications, without limitation.

Lastly, the first image labels and second image labels, both removed of duplicates, and the verified overlapped label are merged to obtain the target classification result for the image for classification.

For example, if the first image label includes guns and games, the second image label includes demonstrations and banners, and the overlapped label includes nudity, the target classification results for the images for classification are determined as guns, games, demonstrations, banners, and nudity.

Figure 4:
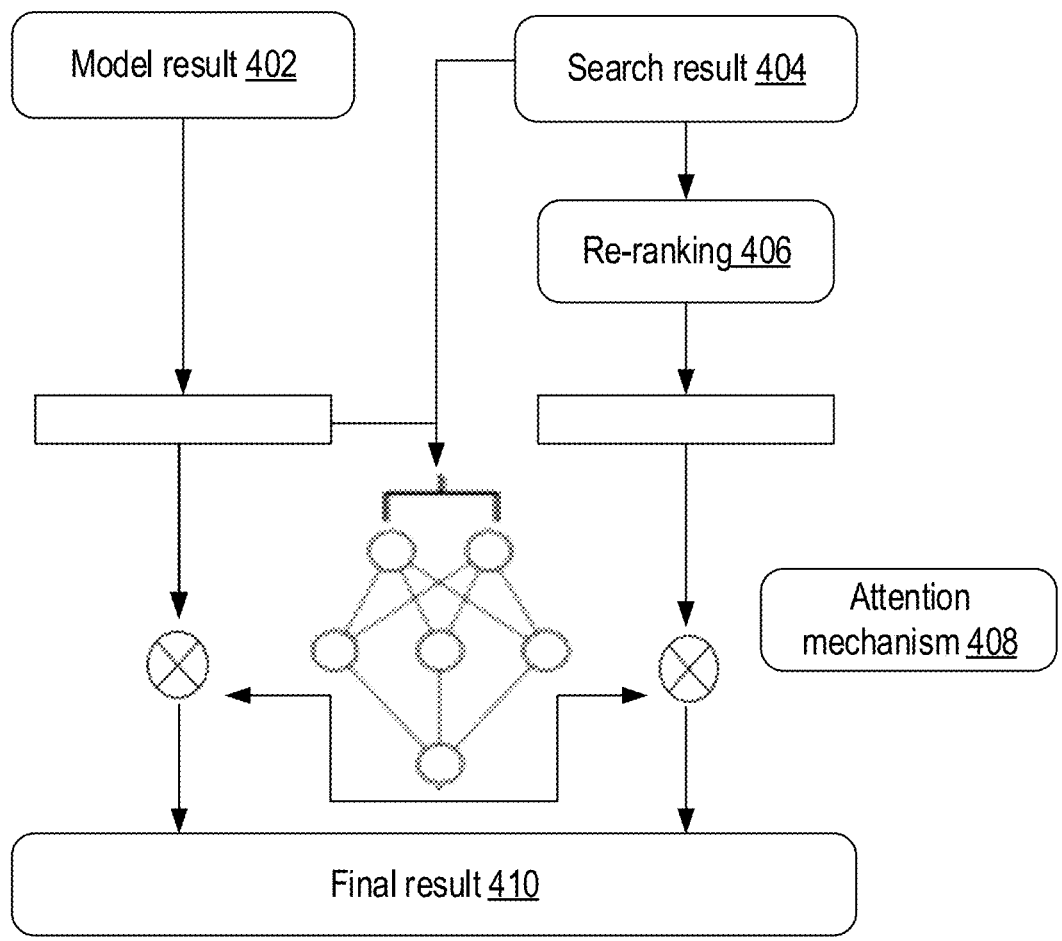
FIG. 4 is a block diagram of a method for image classification according to some embodiments of the disclosure.

FIG. 4 is a flow diagram of a method for image classification according to some embodiments of the disclosure.

In some embodiments and as shown herein, a first classification result (model result) (402) for an image for classification is obtained based on a classification model, and a search result (404) of the image for classification is obtained based on a vector index. Next, the search result (404) is input into a re-ranking model (406) to obtain a second classification result for the image for classification. After the first classification result is merged with the second classification result via an attention mechanism (408), a final result (target classification result) (410) for the image for classification is obtained.

According to various embodiments, with the method for image classification, the final target classification result for the image for classification is determined by merging the first classification result obtained by the classification model with the second classification result obtained by the re-ranking model. By merging different classification results based on models and searches, the accuracy of the classification result for the image for classification can reach 99%, thereby greatly improving the accuracy of the target classification result for the image for classification. In some embodiments, the target classification result for the image for classification is obtained based on a sample database in advance, thereby greatly improving the speed of obtaining the target classification result for the image for classification. Further, matching is performed based on an MD5 value of the image, thereby reducing the amount of computation and improving the system processing performance.

In some embodiments, after a target classification result for the image for classification is determined based on the first classification result and the second classification result, the method further includes: obtaining a service rule policy of a service system and determining whether the target classification result for the image for classification matches the service rule policy; and if the target classification result for the image for classification matches the service rule policy, issuing a warning indication regarding the image for classification, and adding the image for classification and the target classification result corresponding to the image for classification to the sample database.

In various embodiments, the service rule policy is configured based on actual needs, without limitation. For example, the service rule policy of the service system specifies that images, including demonstrations, guns, and nudity cannot pass the review. In this case, if the target classification result for the image for classification includes any one of the labels of demonstrations, guns, and nudity, the image for classification cannot pass the review.

In some embodiments, the sample database is enriched with the sample images. In the case where the image for classification cannot pass the review, the image for classification and the corresponding target classification result, i.e., the label, is added into the sample database to enrich and update the sample database.

In some embodiments, when the content for review is a video and images for classification are a plurality of video frames, if one of the images for classification does not pass the review, the video cannot pass the review. Only if all the video frame images pass the review can the video pass the review.

In some embodiments, after the obtaining a service rule policy of a service system, and determining whether the target classification result for the image for classification matches the service rule policy, the method further includes: if all the target classification results of the image for classification do not match the service rule policy, determining that the video for review passes the review.

According to various embodiments, with the method for image classification, after the target classification result for the image for classification is obtained, it is determined, based on a matching relationship between the target classification result and the service system in the application, whether the image for classification can be utilized in the service system. Different service systems can screen an impactful image for classification by adjusting its service rule policy, and further review a video based on the method for image classification, leading to improved user experiences with high accuracy.

In some embodiments, the method for image classification further includes obtaining a review condition of a user. Based on a matching relationship between the review condition and a target classification result configured for each image, an image corresponding to the review condition is obtained. For example, the review condition of the user specifies obtaining an image that comprises a label associated with games. After the target classification result is configured for each image, the review condition of the user is matched against the target classification result for each image to obtain an image that comprises a label associated with games, from each target classification result. Subsequently, the image is output and displayed to the user.

Figure 5:
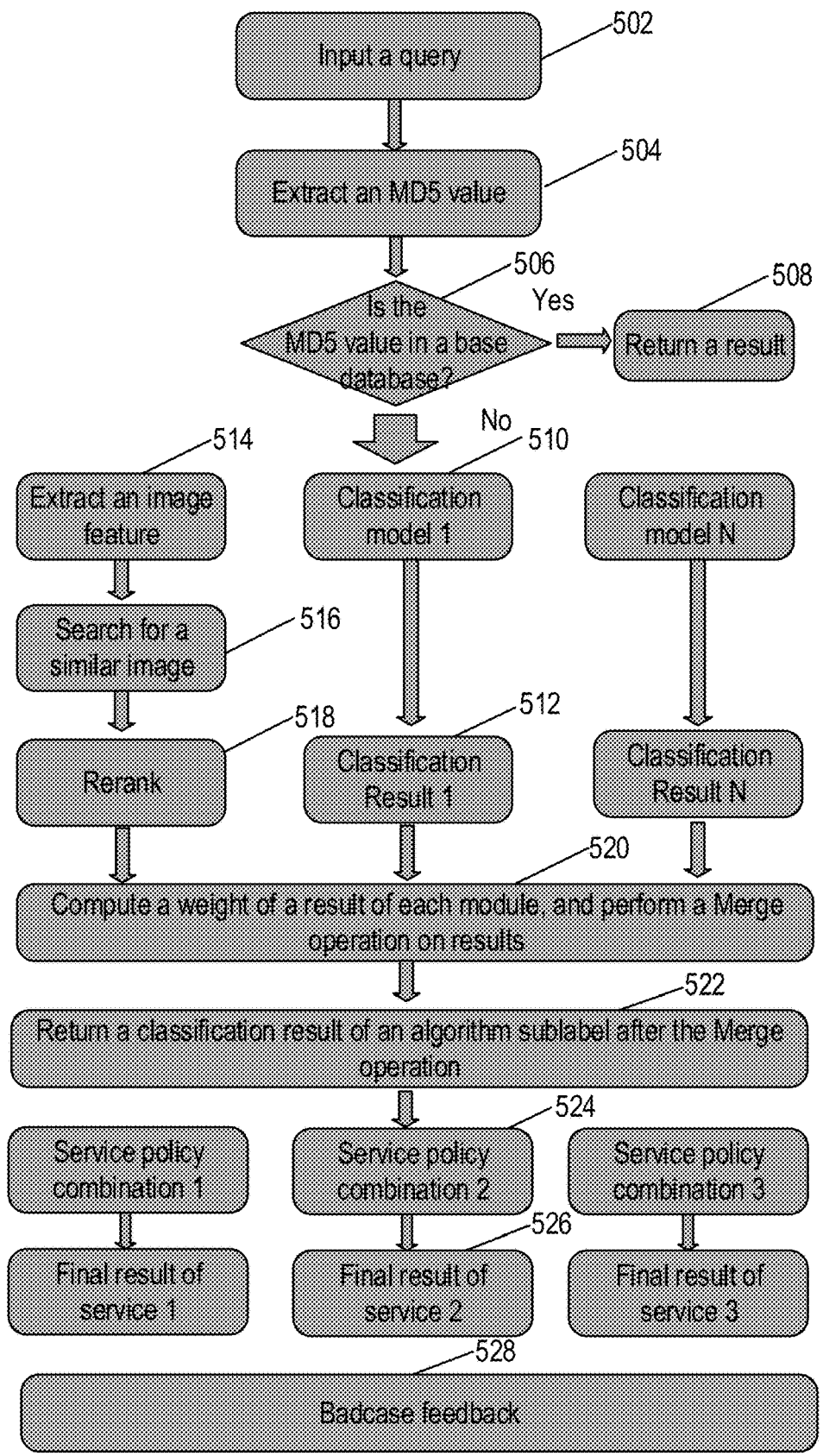
FIG. 5 is a flow diagram illustrating a method for image classification according to some embodiments of the disclosure.

FIG. 5 is a flow diagram illustrating a method for image classification according to some embodiments of the disclosure. In some embodiments and as shown herein, the method includes the following steps.

Step 503: input a query.

In some embodiments, inputting a query is implemented by inputting an image for classification or a video frame image obtained by segmenting a video.

Step 504: extract an MD5 value.

In some embodiments, an MD5 value of the image for classification is extracted.

Step 506: determine whether the MD5 value is stored in a base database. If it is determined that the MD5 value is in the base database, step 508 is performed. If it is determined that the MD5 value is not in the base database, step 510 is performed.

In some embodiments, the base database is a sample database comprising a plurality of sample images that include MD5 values.

In some embodiments, it is determined whether the MD5 value of the image for classification matches the MD5 value of a sample image in the sample database. If it is determined that the MD5 value of the image for classification matches the MD5 value of the sample image in the sample database, a sample label corresponding to the sample image is output as a target classification result for the image for classification. If it is determined that the MD5 value of the image for classification does not match the MD5 value of the sample image in the sample database, the image for classification is output into a classification model.

Step 508: return a result.

In some embodiments, the result is returned by outputting the sample label corresponding to the sample image as the target classification result for the image for classification.

Step 510: input the image for classification into the classification model.

Step 512: output a classification result.

In some embodiments, the image for classification is input into a classification model 1, . . . , and a classification model n, to obtain a classification result 1, . . . , and a classification result n, respectively, which are the first classification results.

Step 514: extract an image feature.

In some embodiments, a feature extraction model extracts the image feature of the image for classification.

Step 516: perform a search for a similar image.

In some embodiments, after the image feature is input into a vector index, a search result of the image for classification is obtained (e.g., the top N number of images similar to the image for classification).

Step 518: input the search result into a model Rerank.

In some embodiments, the model Rerank is a re-ranking model.

In some embodiments, the search result is input into the re-ranking model to obtain a second classification result for the image for classification.

In implementations, step 510 and step 514 are not performed in a particular order and can be performed based on actual conditions.

Step 520: compute a weight of a result of each module, and perform a Merge operation on the results.

In some embodiments, the first classification result and the second classification result are merged based on respective probabilities associated with first image labels in the first classification result and respective probabilities associated with second image labels in the second classification result. Details that are substantially similar to those above-described embodiments are not repeated herein.

Step 522: return a classification result of an algorithm sublabel after the Merge operation.

In some embodiments, after the first classification result and the second classification result are merged, an obtained merged result is used as the target classification result for the image for classification.

Step 524: obtain a service rule policy of a service system.

In some embodiments, a service rule policy of each service is obtained. For example, a service policy combination 1 for service 1, a service policy combination 2 for service 2, and a service policy combination 3 for service 3 are obtained. In turn, it is determined whether the target classification result for the image for classification matches the service rule policies (e.g., service policy combination 1, service policy combination 2, and service policy combination 3).

Step 526: obtain a final result of the service.

In the above example, it is determined whether the target classification result for the image for classification matches the service rule policy 1. If it is determined that the target classification result for the image for classification matches the service rule policy 1, it is indicated that the image for classification is a black sample image for the service 1. In this case, a warning indication is issued regarding the image for classification; and the image for classification and the target classification result corresponding to the image for classification are added to the sample database.

If it is determined that the target classification result for the image for classification does not match the service rule policy 1, it is indicated that the image for classification is a white sample image. In this case, the image for classification passes a system review of the service 1 and be used normally.

Next, it is determined whether the target classification result for the image for classification matches the service rule policy 2. If it is determined that the target classification result for the image for classification matches the service rule policy 2, it is indicated that the image for classification is a black sample image for the service 2. In this case, a warning indication is issued regarding the image for classification; and the image for classification and the target classification result corresponding to the image for classification are added to the sample database.

If it is determined that the target classification result for the image for classification does not match the service rule policy 2, it is indicated that the image for classification is a white sample image. In this case, the image for classification passes a system review of the service 2 and be used normally.

Lastly, it is determined whether the target classification result for the image for classification matches the service rule policy 3. If it is determined that the target classification result for the image for classification matches the service rule policy 3, it is indicated that the image for classification is a black sample image for the service 3. In this case, a warning indication is issued regarding the image for classification; and the image for classification and the target classification result corresponding to the image for classification are added to the sample database.

If it is determined that the target classification result for the image for classification does not match the service rule policy 3, it is indicated that the image for classification is a white sample image. In this case, the image for classification passes a system review of the service 3 and be used normally.

Step 528: perform badcase feedback.

In some embodiments, in the case where the target classification result for the image for classification matches the service rule policy, the image for classification and the target classification result corresponding to the image for classification are added to the sample database to update the sample database.

According to various embodiments of the disclosure, with the method for image classification, by merging different classification results based on model and searches, the accuracy of the classification result for the image for classification can reach 99%, thereby greatly improving the accuracy of the target classification result for the image for classification. Moreover, by feeding badcase back to the search sample database, it is quickly determined whether the classification result for the image for classification is a badcase, thereby improving the speed of image classification and improving the user experience.

Figure 6:
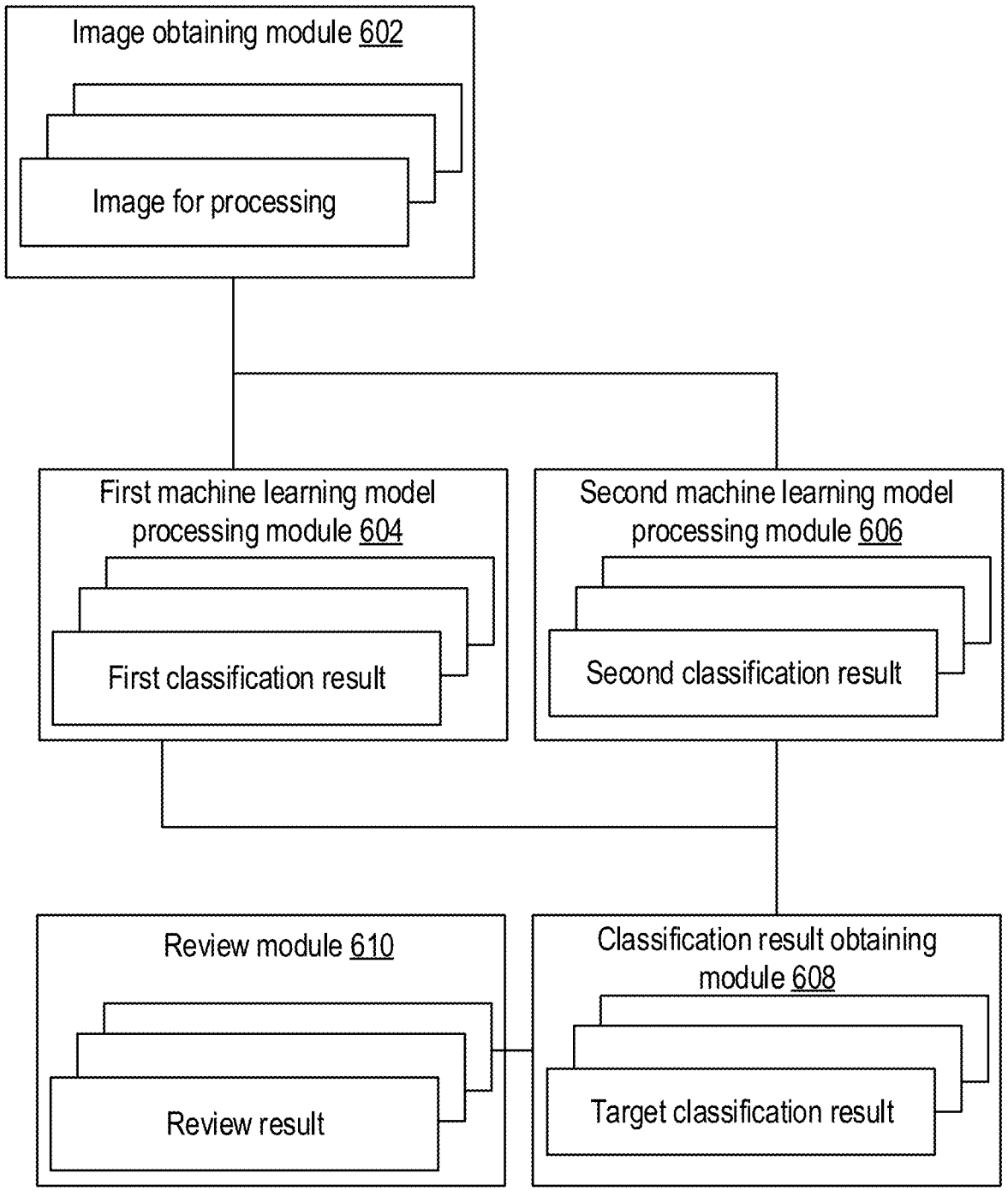
FIG. 6 is a block diagram illustrating an apparatus for image processing according to some embodiments of the disclosure.

FIG. 6 is a diagram illustrating an apparatus for image processing according to some embodiments of the disclosure. In some embodiments and as shown in FIG. 6, the apparatus includes: an image obtaining module (602), a first machine learning model processing module (604), a second machine learning model processing module (606), a classification result obtaining module (608), and a review module (610).

The image obtaining module (602) is configured to obtain an image for processing.

The first machine learning model processing module (604) is configured to compute, based on a first machine learning model, a first classification result for the image, wherein the first machine learning model is configured for labeling the image and outputting labels and respective probabilities associated with the labels for the image.

The second machine learning model processing module (606) is configured to compute, based on a second machine learning model, a second classification result for the image, wherein the second machine learning model is configured for labeling the image based on vector search results of the image, outputting labels and respective probabilities associated with the labels for the image.

The classification result obtaining module (608) is configured to determine a target classification result for the image for classification, based on at least the first classification result and the second classification result.

The review module (610) is configured to review the image based on the target classification result.

In some embodiments, the apparatus further includes a policy obtaining module configured to obtain a service rule policy of a service system.

Correspondingly, the review module (610) is further configured to determine whether the target classification result for the image for classification matches the service rule policy, and if the target classification result for the image for classification does not match the service rule policy, determine that the image for classification passes the review.

Details of the apparatus for image processing that are substantially similar to those above-described embodiments are not repeated herein.

Figure 7:
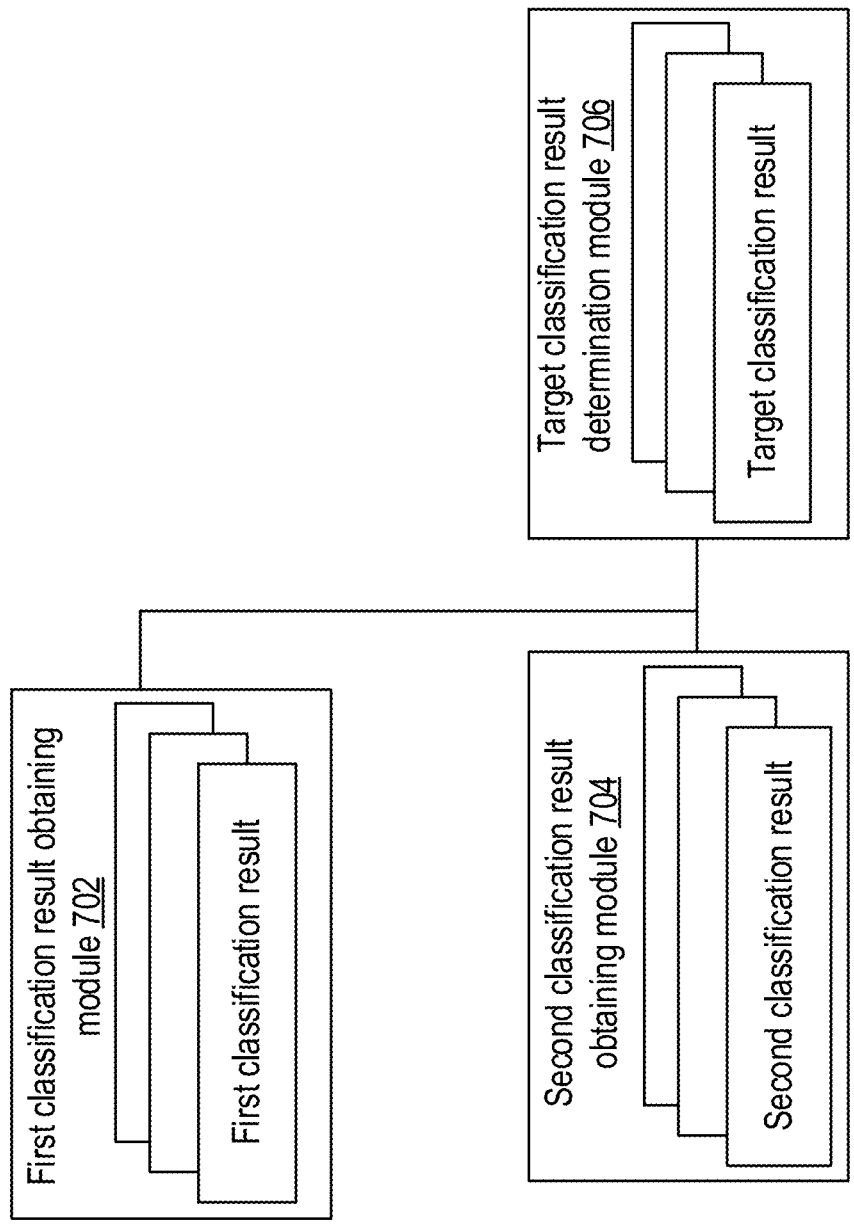
FIG. 7 is a block diagram illustrating an apparatus for image classification according to some embodiments of the disclosure.

FIG. 7 is block diagram illustrating an apparatus for image classification according to some embodiments of the disclosure. In some embodiments and as shown in FIG. 7, the apparatus includes: a first classification result obtaining module (702), a second classification result obtaining module (704), and a target classification result determination module (706).

The first classification result obtaining module (702) is configured to receive an image and obtain a first classification result for the image based on a classification model.

The second classification result obtaining module (704) is configured to process the image for classification based on a preset process, and provide a processing result into a re-ranking model to obtain a second classification result for the image for classification.

The target classification result determination module (706) is configured to determine a target classification result for the image for classification based on the first classification result and the second classification result.

In some embodiments, the second classification result obtaining module (704) is further configured to: extract an image feature of the image for classification based on a feature extraction model; input the image feature into a vector index to obtain a search result of the image for classification; and input the search result into the re-ranking model to obtain the second classification result for the image for classification.

In some embodiments, the apparatus further includes a matching module configured to: match the image for classification against a sample image in a sample database to determine whether there is a sample image matching the image for classification in the sample database; and if there is no sample image matching the image for classification in the sample database, obtain the first classification result for the image for classification based on the classification model, wherein the sample database stores sample images and sample labels corresponding to each sample image.

In some embodiments, each sample image in the sample database has an MD5 value. As such, the first matching module is further configured to: extract an MD5 value of the image for classification; and match the MD5 value of the image for classification against the MD5 value of the sample image in the sample database.

In some embodiments, the classification model is trained by the following steps of: obtaining a training sample data set, wherein the sample data set comprises sample data, and sample labels corresponding to each piece of sample data; classifying the training sample data set based on preset dimensions to obtain training sample data corresponding to each combination of the dimensions, wherein the training sample data corresponding to each combination of the dimensions corresponds to an initial classification model; and respectively training the corresponding initial classification model by the training sample data corresponding to each combination of the dimensions to obtain the classification model, wherein the classification model outputs sample labels of the sample data and respective probabilities associated with the sample labels for the sample data.

In some embodiments, the feature extraction model is trained by the following steps of: obtaining a training sample data set, wherein the sample data set comprises sample data, and a sample feature corresponding to each piece of sample data; and training an initial feature extraction model by the sample data set to obtain the feature extraction model, wherein the feature extraction model outputs the sample feature corresponding to each piece of sample data.

In some embodiments, the re-ranking model is trained by the following steps of: obtaining a training sample data set, wherein the sample data set comprises sample search results and sample labels of each sample search result; and training an initial re-ranking model by the training sample data set, to obtain the re-ranking model, wherein the re-ranking model outputs the sample labels of the sample data and respective probabilities associated with the sample labels for the sample search results.

In some embodiments, the first classification result obtaining module (702) is further configured to obtain, based on the classification model, first image labels and respective probabilities associated with the first image labels for the image for classification.

In some embodiments, the second classification result obtaining module (704) is further configured to provide the search results into the re-ranking model to obtain second image labels and respective probabilities associated with the second image labels for the image for classification.

In some embodiments, the target classification result determination module (706) is further configured to match the first image labels against the second image labels to obtain the matching first image labels and the matching second image labels that match with each other; determine an overlapped label of the image for classification based on respective probabilities associated with the matching first image labels and respective probabilities associated with the matching second image labels; and merge the first image labels and the second image labels that do not match each other and the overlapped label to obtain the target classification result for the image for classification.

In some embodiments, the apparatus further includes a target classification result obtaining module configured to: if there is a sample image matching the image for classification in the sample database, use the sample labels corresponding to the sample image matching the image for classification as the target classification result for the image for classification.

In some embodiments, the apparatus further includes: an image review module configured to obtain a service rule policy of a service system, and determine whether the target classification result for the image for classification matches the service rule policy; and a storage module configured to: if the target classification result for the image for classification matches the service rule policy, issue a warning indication regarding the image for classification; and add the image for classification and the target classification result corresponding to the image for classification to the sample database.

In some embodiments, the first classification result obtaining module (702) is further configured to: receive a video for review; segment the video for review to obtain a video frame sequence, wherein a video frame in the video frame sequence represents the image for classification.

In some embodiments, the apparatus further includes a video review module configured to: if all the target classification results of the image for classification do not match the service rule policy, determining that the video for review passes the review.

According to various embodiments, the apparatus for image is configured to: receive an image for classification; obtain a first classification result for the image for classification based on a classification model; process the image for classification based on a preset process; provide a processing result into a re-ranking model to obtain a second classification result for the image for classification; and determine a target classification result for the image for classification based on the first classification result and the second classification result. The two different results output based on different models are merged to implement the classification of the image for classification, thereby improving the accuracy in obtaining an image using image classification.

Details of the apparatus for image classification that are substantially similar to those above-described embodiments are not repeated herein.

Figure 8:
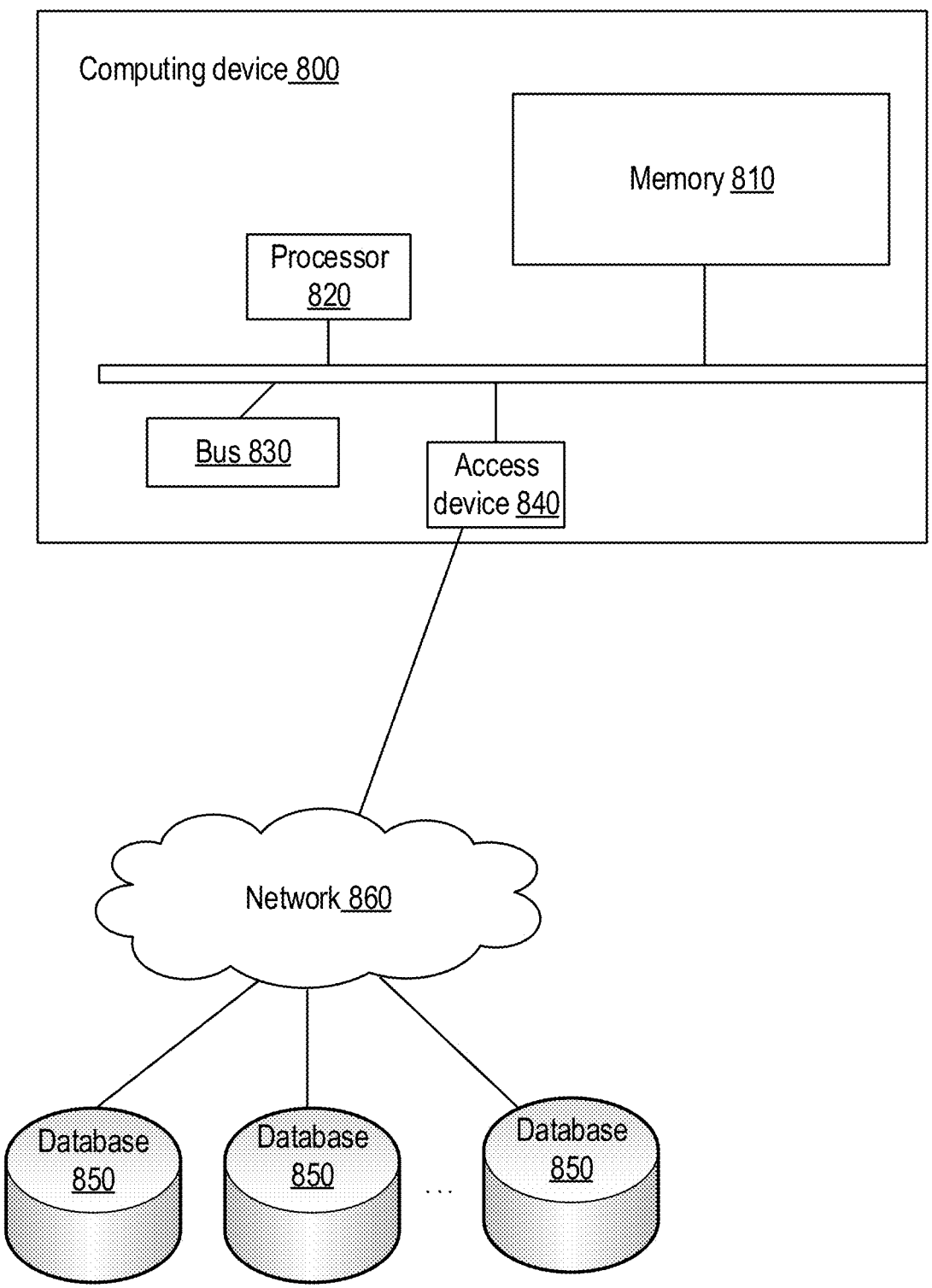
FIG. 8 is a block diagram of a computing device according to some embodiments of the disclosure.

FIG. 8 is a block diagram of a computing device according to some embodiments of the disclosure. In some embodiments and as shown herein, the computing device (800) includes: a memory (810) and a processor (820). The processor (820) and the memory (810) are connected via a bus (830), and a database (850) is used to store data.

In some embodiments, the computing device (800) further includes an access device (840) that enables the computing device (800) to communicate via one or a plurality of networks (860). Examples of these networks include public switched telephone networks (PSTNs), local area networks (LANs), wide area networks (WANs), personal area networks (PANs), or a combination of communication networks such as the Internet. The access device 840 may include one or a plurality of any type of wired or wireless network interfaces (for example, a network interface card (NIC)), such as IEEE 802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In embodiments of the disclosure, the above components of the computing device (800) and other components not shown in FIG. 8 may also be connected to each other, e.g., via a bus. It should be understood that the block diagram of the computing device shown in FIG. 8 is presented only for illustrative purposes, and is not intended to limit the scope of the disclosure. Those skilled in the art can add or replace any components as needed.

The computing device (800) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 800 can also be a mobile or stationary server.

In some embodiments, the processor (820) is configured to execute the computer-executable instructions to perform the following steps of: obtaining an image for processing computing, based on a first machine learning model, a first classification result for the image, wherein the first machine learning model is configured for labeling the image and outputting labels and respective probabilities associated with the labels for the image computing, based on a second machine learning model, a second classification result for the image, wherein the second machine learning model is configured for labeling the image based on vector search results of the image, outputting labels and respective probabilities associated with the labels for the image determining a target classification result for an image for classification, based at least on the first classification result and the second classification result; an reviewing the image based on the target classification result.

Details a computing device that are substantially similar to those above-described embodiments are not repeated herein.

Figure 9:
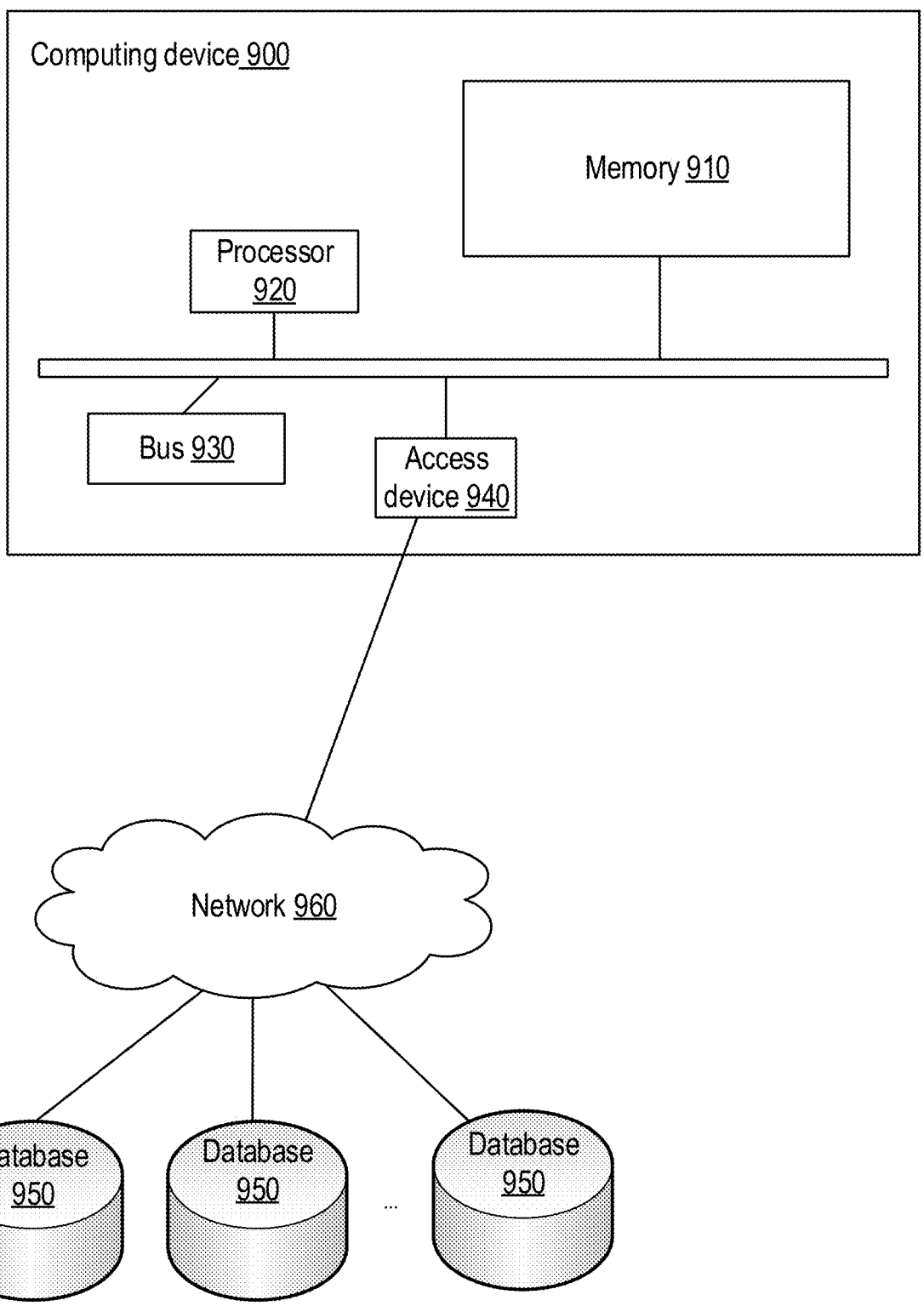
FIG. 9 is a structural block diagram of a second computing device provided by an embodiment of the disclosure.

FIG. 9 is a block diagram of a computing device according to some embodiments of the disclosure. In some embodiments and as shown herein, the computing device (900) includes: a memory (910) and a processor (920). The processor (920) and the memory (910) are connected via a bus (930), and a database (950) is used to store data.

In some embodiments, the computing device (900) further includes an access device (940) that enables the computing device (900) to communicate via one or a plurality of networks (960). Examples of these networks include public switched telephone networks (PSTNs), local area networks (LANs), wide area networks (WANs), personal area networks (PANs), or a combination of communication networks such as the Internet. The access device 940 may include one or a plurality of any type of wired or wireless network interfaces (for example, a network interface card (NIC)), such as IEEE802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In embodiments of the disclosure, the above components of the computing device (900) and other components not shown in FIG. 9 may also be connected to each other, e.g., via a bus. It should be understood that the block diagram of the computing device shown in FIG. 9 is presented only for illustrative purposes, and is not intended to limit the scope of the disclosure. Those skilled in the art can add or replace any components as needed.

The computing device (900) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 900 can also be a mobile or stationary server.

In some embodiments, the processor (920) is configured to execute the computer-executable instructions to perform the following steps of: receiving an image for classification, and obtaining a first classification result for the image for classification based on a classification model; processing the image for classification based on a preset process, and providing a processing result into a re-ranking model to obtain a second classification result for the image for classification determining a target classification result for the image for classification based on the first classification result and the second classification result.

Details of the computing device that are substantially similar to those above-described embodiments are not repeated herein.

An embodiment of the disclosure further provides a computer-readable storage medium for storing computer instructions that, when executed by a processor, implement the steps of the methods for image processing or the methods for image classification as described in the disclosure.

Details of the computer-readable storage medium that are substantially similar to those above-described embodiments are not repeated herein.

Figure 10:
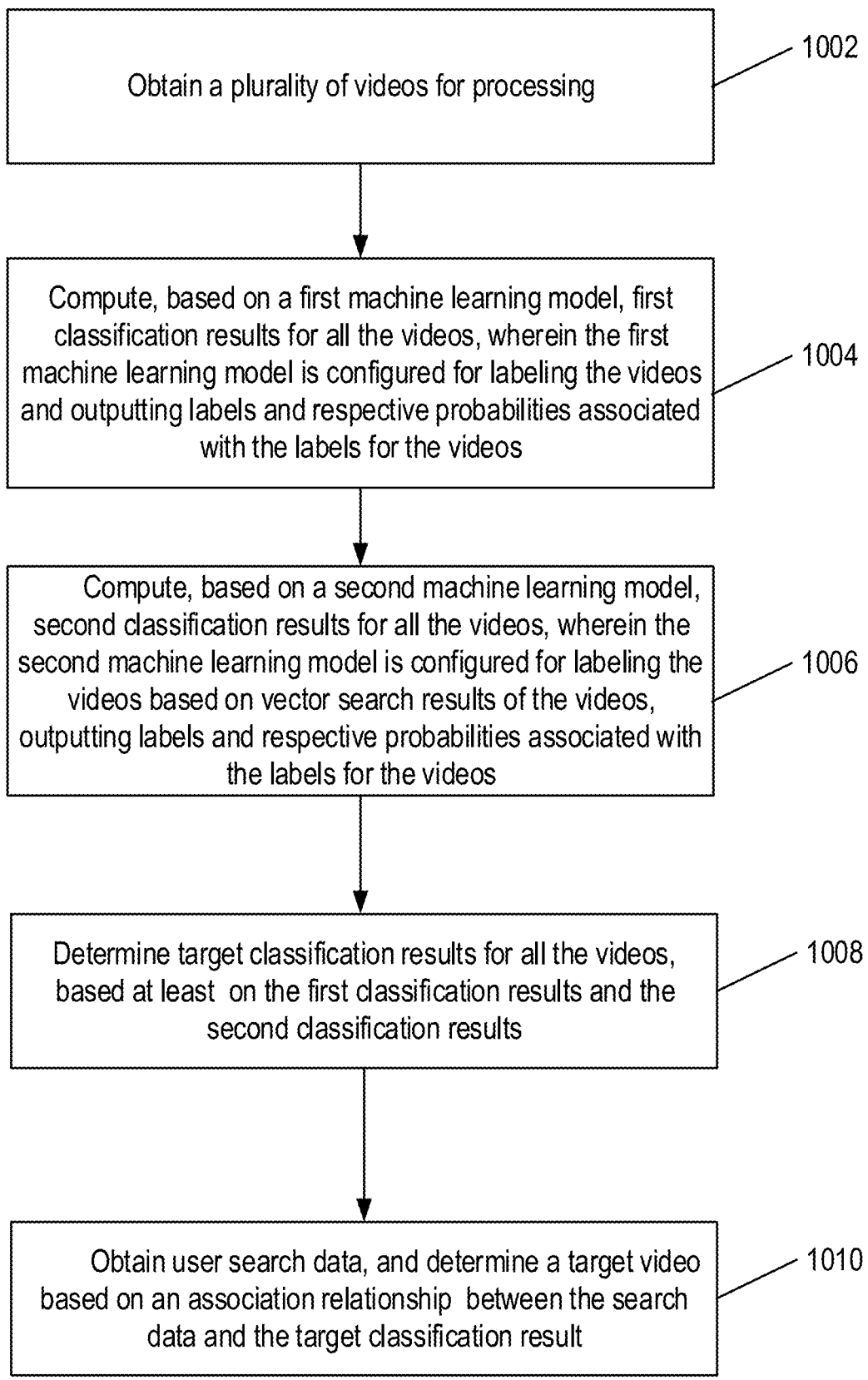
FIG. 10 is a block diagram of a computing device according to some embodiments of the disclosure.

FIG. 10 is a flow diagram illustrating a method for video searches according to some embodiments of the disclosure. In some embodiments and as shown herein, the method includes the following steps.

Step 1002: obtain a plurality of videos for processing.

Step 1004: computer first classification results for all the videos for processing based on a first machine learning model, wherein the first machine learning model is configured for labeling the videos and outputting labels and respective probabilities associated with the labels for the videos.

In some embodiments, after the plurality of videos for processing are obtained, each video for processing is segmented into a video frame sequence, and the first classification result for a video frame in each video frame sequence is computed based on the first machine learning model. In some embodiments, the first classification result for each video for processing is implemented as the sum of the first classification results of all the video frames in the video frame sequence of the video for processing.

In some embodiments, the first machine learning model is a classification model. After the video frame sequence is input, the first machine learning model outputs labels corresponding to the video frame sequence and respective probabilities associated with the labels.

In some embodiments, the computation of the first classification results for all the videos for processing based on the first machine learning model is substantially similar to computing the first classification result for the image for processing based on the first machine learning model in the above embodiments.

Step 1006: compute second classification results for all the videos for processing based on a second machine learning model, wherein the second machine learning model is configured for labeling the videos based on vector search results of the videos and outputting labels and respective probabilities associated with the labels for the videos.

In some embodiments, the second machine learning model is another classification model different from the first machine learning model. In some embodiments, an input of the second machine learning model is the vector search results of each video frame obtained by vector index search. Based on the vector search results, the second machine learning model also outputs the labels corresponding to the videos and the respective probabilities associated with the labels.

In some embodiments, after the plurality of videos for processing are obtained, each video for processing is segmented into a video frame sequence, and the second classification result for a video frame in each video frame sequence is computed based on the second machine learning model. In some embodiments, the second classification result for each video for processing is implemented as the sum of the second classification results of all the video frames in the video frame sequence of the video for processing.

In some embodiments, the computation of the second classification results for all the videos for processing based on the second machine learning model is substantially similar to computing the second classification result for the image for processing based on the second machine learning model in the above embodiments, and details are not repeated herein.

Step 1008: determine target classification results of all the videos for processing based on at least the first classification results and the second classification results.

In some embodiments, determining the target classification results of all the videos for processing based on the first classification results and the second classification results, are substantially similar to the above-described embodiments, and details are not repeated herein.

Step 1010: obtain user search data, and determine a target video based on an association relationship between the search data and the target classification result.

In some embodiments, the user search data includes but is not limited to various labels configured by the user; while the target classification results are the labels of each video for processing.

In some embodiments, after the user search data is obtained, the user search data is matched against the target classification result for each video for processing to obtain a video for processing that matches the target classification result (e.g., the target video).

For example, if the user search data includes guns and vehicles, all the videos for processing having the target classification result comprising guns and vehicles are the target videos corresponding to the user search data.

In some embodiments, the video searches are applied to video shopping. After user search data is input, a plurality of target videos associated with a desired item is recommended to the user, based on the user search data (e.g., the model and color of the desired item), for the user to choose.

In some embodiments, with the method for video searches, after videos for processing are obtained, a target classification result is configured for each video for processing. In implementations, after user search data is received, a target video which the user is interested in is searched for based on user needs to improve the user experience.

Figure 11:
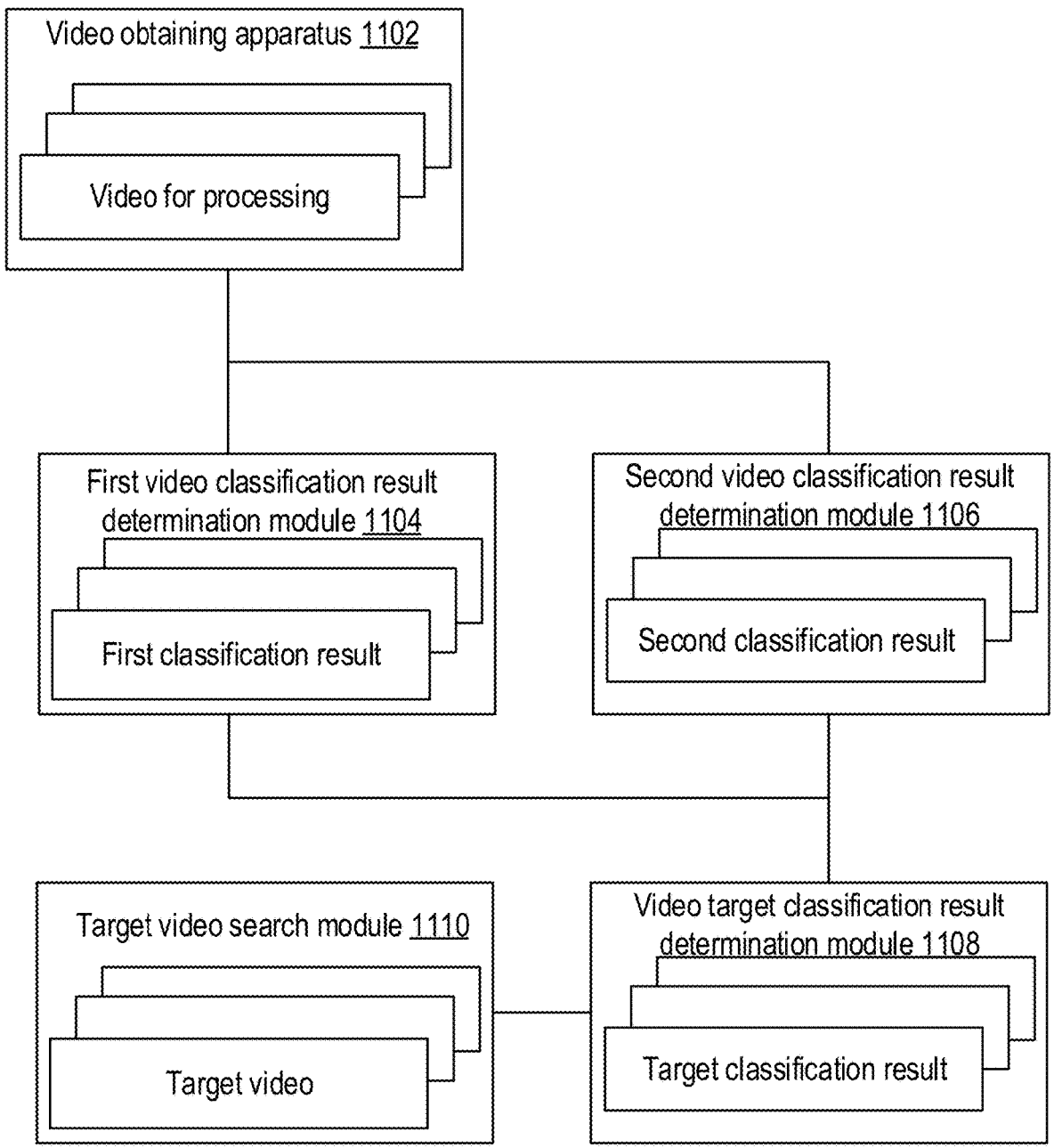
FIG. 11 is a block diagram of a computing device according to some embodiments of the disclosure.

FIG. 11 is a block diagram illustrating an apparatus for video searches according to some embodiments of the disclosure. In some embodiments and as shown herein, the apparatus includes: a video obtaining module (1102), a first video classification result determination module (1104), a second video classification result determination module (1106) a video target classification result determination module (1108) and a target video search module (1110).

The video obtaining apparatus (1102) is configured to obtain a plurality of videos for processing.

The first video classification result determination module (1104) is configured to compute, based on a first machine learning model, first classification results for all the videos, wherein the first machine learning model is configured for labeling the videos and outputting labels and respective probabilities associated with the labels for the videos.

The second video classification result determination module (1106) is configured to compute, based on a second machine learning model, second classification results for all the videos, wherein the second machine learning model is configured for labeling the videos based on vector search results of the videos, outputting labels and respective probabilities associated with the labels for the videos.

The video target classification result determination module (1108) is configured to determine target classification results for all the videos for processing based at least on the first classification results and the second classification results.

The target video search module (1110) is configured to obtain user search data and determine a target video based on an association between the search data and the target classification result.

Details of the apparatus for video searches that are substantially similar to those above-described embodiments are not repeated herein.

Figure 12:
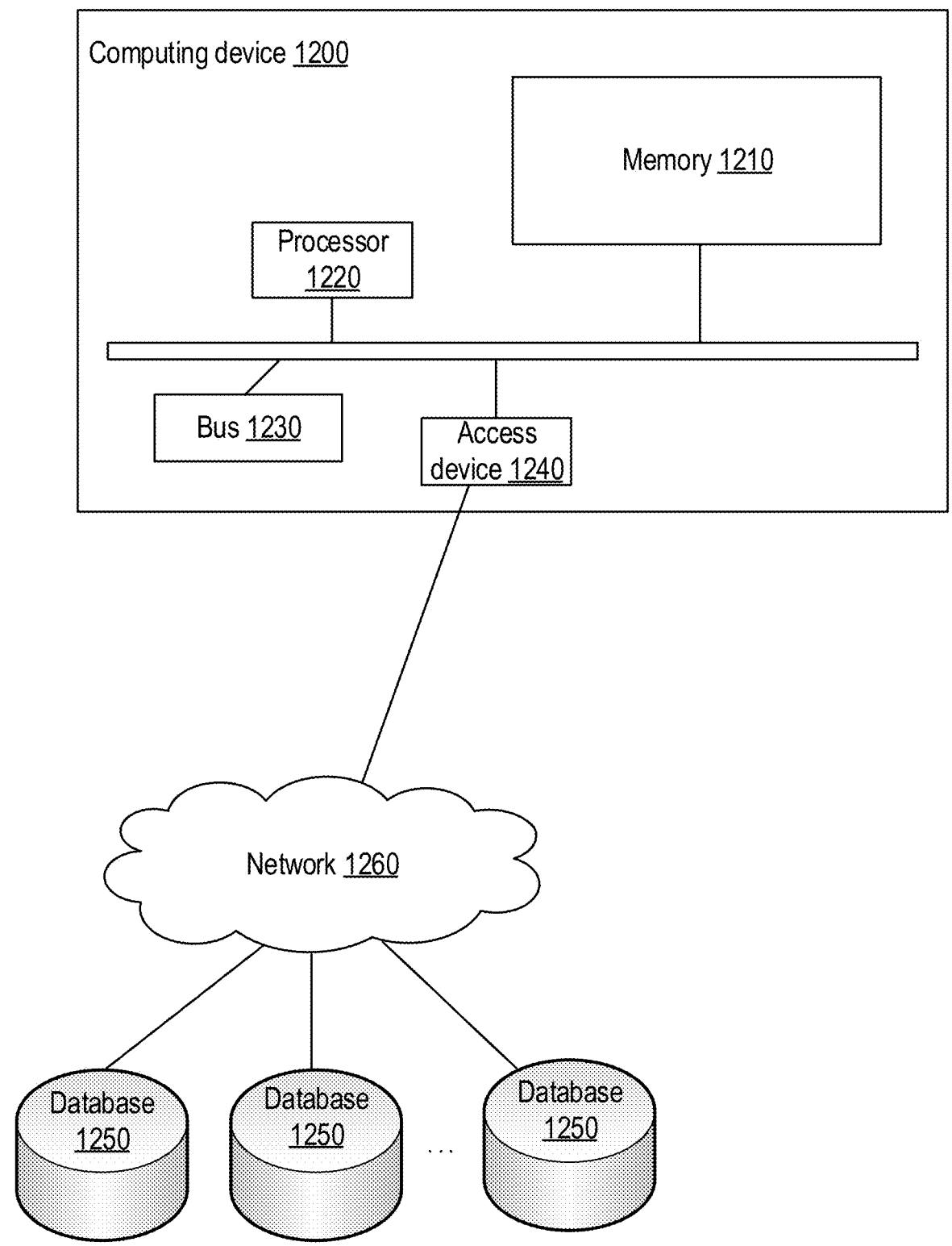
FIG. 12 is a block diagram of a computing device according to some embodiments of the disclosure.

FIG. 12 is a block diagram of a computing device according to some embodiments of the disclosure. In some embodiments and as shown herein, the computing device (1200) includes: a memory (1210) and a processor (1220). The processor (1220) and the memory (1210) are connected via a bus (1230), and a database (1250) is used to store data.

In some embodiments, the computing device (1200) further includes an access device (1240) that enables the computing device (1200) to communicate via one or a plurality of networks (1260). Examples of these networks include public switched telephone networks (PSTNs), local area networks (LANs), wide area networks (WANs), personal area networks (PANs), or a combination of communication networks such as the Internet. The access device 1240 may include one or a plurality of any type of wired or wireless network interfaces (for example, a network interface card (NIC)), such as IEEE802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In embodiments of the disclosure, the above components of the computing device (1200) and other components not shown in FIG. 12 may also be connected to each other, e.g., via a bus. It should be understood that the block diagram of the computing device shown in FIG. 12 is presented only for illustrative purposes, and is not intended to limit the scope of the disclosure. Those skilled in the art can add or replace any components as needed.

The computing device (1200) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 1200 can also be a mobile or stationary server.

In some embodiments, the processor (1220) is configured to execute the computer-executable instructions to perform the following steps of: receiving an image for classification, and obtaining a first classification result for the image for classification based on a classification model; processing the image for classification based on a preset process, and providing a processing result into a re-ranking model to obtain a second classification result for the image for classification; determining a target classification result for the image for classification based on the first classification result and the second classification result.

Details of the computing device that are substantially similar to those above-described embodiments are not repeated herein.

An embodiment of the disclosure further provides a computer-readable storage medium for storing computer instructions, when executed by a processor, implement the steps of the video search methods as described in the disclosure.

The foregoing is an illustrative solution of a computer-readable storage medium of the embodiment. It should be noted that the technical solution of the storage medium shares the same concept as that of the technical solution of the video search method described above. For content of the technical solution of the storage medium that is not described in detail, reference can be made to the description of the technical solution of the foregoing video search method.

The specific embodiments in the description of the present application have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The computer instructions include computer program code, which may be in the form of source code, object code, executable files, or some intermediate forms. The computer-readable medium may include: any entity or device capable of carrying the computer program code, a recording medium, a USB flash disk, a mobile hard disk, a magnetic disk, an optical disc, a computer memory, a read-only memory (ROM), a random access memory (RAM), electrical carrier signals, telecommunication signals, and a software distribution medium. It should be noted that the content contained in the computer-readable medium can be appropriately added or deleted in accordance with the requirements of the legislation and patent practice in the jurisdiction. For example, in some jurisdictions, according to the legislation and patent practice, the computer-readable medium does not include electrical carrier signals and telecommunication signals.

It should be noted that for simplicity of description, the above method embodiments are all expressed as a combination of a series of actions, but those skilled in the art should know that the embodiments of the disclosure are not limited by the described sequence of actions, because some steps can be performed in other orders or simultaneously according to the embodiments of the disclosure. Furthermore, those skilled in the art should also know that the embodiments described herein are all preferred embodiments, and the involved actions and modules are not necessarily all required by the embodiments of the disclosure.

In the above embodiments, the description of each embodiment has its own emphasis. For parts that are not described in detail in a certain embodiment, reference can be made to related descriptions of other embodiments.

The preferred embodiments of the disclosure above are only disclosed to facilitate explanation of the disclosure. The details of the optional embodiments are not elaborated herein, and are not intended to be limiting. Obviously, many modifications and changes can be made according to the content of the embodiments of the disclosure. The disclosure selects and specifically describes these embodiments in order to better explain the principles and actual applications of the embodiments of the disclosure, so that those skilled in the art can understand and use the disclosure appropriately. The disclosure is limited only by the claims and the full scope and equivalents thereof.

The invention claimed is:

1. A method comprising:
   obtaining an image;
   computing, based on a first machine learning model, a first classification result for the image, the first machine learning model configured to label the image and output first labels and respective first probabilities associated with the first labels for the image;
   computing, based on a second machine learning model operating independently from the first machine learning model, a second classification result for the image, the second machine learning model configured to; perform a vector search using features extracted from the image to obtain vector search results, label the image based on the vector search results of the image and output second labels and respective second probabilities associated with the second labels for the image; and
   determining a target classification result for the image by combining the first classification result and the second classification result, the target classification result including a subset of labels selected from the first labels and the second labels based on their respective probabilities.

2. The method of claim 1, further comprising reviewing the image based on the target classification result.

3. The method of claim 2, the reviewing the image comprising:
   obtaining a service rule policy of a service system;
   determining whether the target classification result for the image matches the service rule policy; and
   determining that the image passes the review when the target classification result for the image does not match the service rule policy.

4. The method of claim 1, the first machine learning model comprising a classification model and the computing a second classification result for the image comprising:
   processing the image based on a preset process; and
   providing the processed image into a re-ranking model to obtain the second classification result for the image.

5. The method of claim 4, the computing a second classification result for the image further comprising:
   extracting an image feature of the image based on a feature extraction model;
   providing the image feature into a vector index to obtain a search result of the image; and providing the search result into the re-ranking model to obtain the second classification result for the image.

6. The method of claim 4, further comprising:
matching the image against a sample image in a sample database;
determining whether there is a sample image matching the image in the sample database; and
responsive to that there is no sample image matching the image in the sample database, obtaining the first classification result for the image based on the classification model, the sample database storing sample images and sample labels corresponding to each sample image.

7. The method of claim 6, each sample image in the sample database having an MD5 value, and the matching the image against a sample image in a sample database comprising:
extracting an MD5 value of the image; and
matching the MD5 value of the image against a MD5 value of the sample image in the sample database.

8. The method of claim 1, the determining a target classification result for the image based at least on the first classification result and the second classification result comprising:
matching the first image labels against the second image labels to obtain matching first image labels and matching second image labels;
determining an overlapped label of the image based on respective probabilities associated with the matching first image labels and respective probabilities associated with the matching second image labels; and
merging the first image labels and the second image labels that do not match each other and the overlapped label to obtain the target classification result for the image.

9. An apparatus comprising:
a processor; and
a storage medium for tangibly storing thereon program logic for execution by the processor, the stored program logic comprising:
logic, executed by the processor, for obtaining an image,
logic, executed by the processor, for computing, based on a first machine learning model, a first classification result for the image, the first machine learning model configured to label the image and output first labels and respective first probabilities associated with the first labels for the image,
logic, executed by the processor, for computing, based on a second machine learning model operating independently from the first machine learning model, a second classification result for the image, the second machine learning model configured to; perform a vector search using features extracted from the image to obtain vector search results, label the image based on the vector search results of the image and output second labels and respective second probabilities associated with the second labels for the image, and
logic, executed by the processor, for determining a target classification result for the image by combining the first classification result and the second classification result, the target classification result including a subset of labels selected from the first labels and the second labels based on their respective probabilities.

10. The apparatus of claim 9, the stored program logic further comprising:

logic, executed by the processor, for reviewing the image based on the target classification result.

11. The apparatus of claim 10, the logic for reviewing the image comprising:
logic, executed by the processor, for obtaining a service rule policy of a service system, and
logic, executed by the processor, for determining whether the target classification result for the image matches the service rule policy, and
logic, executed by the processor, for determining that the image passes the review when the target classification result for the image does not match the service rule policy.

12. The apparatus of claim 10, the first machine learning model comprising a classification model; and the logic for computing a second classification result for the image comprising:
logic, executed by the processor, for processing the image based on a preset process, and
logic, executed by the processor, for providing the processed image into a re-ranking model to obtain the second classification result for the image.

13. The apparatus of claim 12, the logic for computing a second classification result for the image further comprising:
logic, executed by the processor, for extracting an image feature of the image based on a feature extraction model,
logic, executed by the processor, for providing the image feature into a vector index to obtain a search result of the image, and
logic, executed by the processor, for providing the search result into the re-ranking model to obtain the second classification result for the image.

14. The apparatus of claim 12, the stored program logic further comprising:
logic, executed by the processor, for matching the image against a sample image in a sample database,
logic, executed by the processor, for determining whether there is a sample image matching the image in the sample database, and
logic, executed by the processor, for, responsive to that there is no sample image matching the image in the sample database, obtaining the first classification result for the image based on the classification model, the sample database storing sample images and sample labels corresponding to each sample image.

15. A non-transitory computer-readable storage medium for tangibly storing computer program instructions capable of being executed by a computer processor, the computer program instructions defining the steps of:
obtaining an image;
computing, based on a first machine learning model, a first classification result for the image, the first machine learning model configured to label the image and output first labels and respective first probabilities associated with the first labels for the image;
computing, based on a second machine learning model operating independently from the first machine learning model, a second classification result for the image, the second machine learning model configured to; perform a vector search using features extracted from the image to obtain vector search results, label the image based on the vector search results of the image and output second labels and respective second probabilities associated with the second labels for the image; and determining a target classification result for the image by combining the first classification result and the second classification result, the target classification result including a subset of labels selected from the first labels and the second labels based on their respective probabilities.

16. The computer-readable storage medium of claim 15, the computer program instructions further defining the steps of:
reviewing the image based on the target classification result.

17. The computer-readable storage medium of claim 16, the reviewing the image comprising:
obtaining a service rule policy of a service system;
determining whether the target classification result for the image matches the service rule policy; and
determining that the image passes the review when the target classification result for the image does not match the service rule policy.

18. The computer-readable storage medium of claim 15, the first machine learning model comprising a classification model and the computing a second classification result for the image comprising:
processing the image based on a preset process; and
providing the processed image into a re-ranking model to obtain the second classification result for the image.

19. The computer-readable storage medium of claim 18, the computing a second classification result for the image further comprising:
extracting an image feature of the image based on a feature extraction model;
providing the image feature into a vector index to obtain a search result of the image; and
providing the search result into the re-ranking model to obtain the second classification result for the image.

20. The computer-readable storage medium of claim 18, the computer program instructions further defining the steps of:
matching the image against a sample image in a sample database;
determining whether there is a sample image matching the image in the sample database; and
responsive to that there is no sample image matching the image in the sample database, obtaining the first classification result for the image based on the classification model, the sample database storing sample images and sample labels corresponding to each sample image.

* * * * *